US012282472B1

(12) United States Patent
Rittinger et al.

(10) Patent No.: US 12,282,472 B1
(45) Date of Patent: Apr. 22, 2025

(54) AUTOMATIC EXTENSION OF A PARTIALLY-EDITABLE DATASET COPY

(71) Applicant: SAP SE, Walldorf (DE)

(72) Inventors: Jan Rittinger, Wiesloch (DE); Johannes Meinecke, Heidelberg (DE); Gregor Hackenbroich, Hockenheim (DE); Richard Pilz, Dresden (DE); Katja Pfeifer, Dresden (DE); Tom Spiegler, Langebrück (DE); Franz Josef Grueneberger, Dresden (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/598,195

(22) Filed: Mar. 7, 2024

Related U.S. Application Data

(60) Provisional application No. 63/621,315, filed on Jan. 16, 2024.

(51) Int. Cl.
G06F 16/23 (2019.01)
(52) U.S. Cl.
CPC .............................. G06F 16/2343 (2019.01)
(58) Field of Classification Search
CPC .................................................. G06F 16/2343
See application file for complete search history.

(56) References Cited

U.S. PATENT DOCUMENTS

| | | | |
|---|---|---|---|
| 7,616,642 B2 | 11/2009 | Anke et al. | |
| 7,616,960 B2 | 11/2009 | Anke et al. | |
| 7,676,522 B2 | 3/2010 | Klein et al. | |
| 7,676,523 B2 | 3/2010 | Klein et al. | |
| 8,346,819 B2 | 1/2013 | Do et al. | |
| 9,721,002 B2 | 8/2017 | Pfeifer et al. | |
| 9,836,549 B2 | 12/2017 | Heinrich et al. | |
| 9,922,300 B2 | 3/2018 | Rittinger et al. | |
| 9,990,388 B2 | 6/2018 | Meinecke et al. | |
| 10,216,793 B2 | 2/2019 | Ji et al. | |
| 10,311,061 B2 | 6/2019 | Ji et al. | |

(Continued)

FOREIGN PATENT DOCUMENTS

JP 2009-151371 7/2009

OTHER PUBLICATIONS

Extended European Search Report in European Appln. No. 22186717.9, mailed on Jan. 26, 2023, 6 pages.

(Continued)

*Primary Examiner* — Etienne P Leroux
(74) *Attorney, Agent, or Firm* — Fish & Richardson P.C.

(57) ABSTRACT

The present disclosure involves systems, software, and computer implemented methods for automatically extending a partially-editable dataset copy. One example method includes identifying, for a data set, extension filter criteria that extends a current filter that defines an editable portion of the data set. An extended filter is automatically generated for the data set based on the extension filter criteria and the current filter. Additional data is copied into the partially-editable copy of the data set based on the extended filter and the current filter to generate an updated partially-editable copy of the data set. The current filter is replaced with the extended filter to create a new current filter. An updated exposed view is generated using the new current filter that exposes the updated partially-editable copy of the data set and an updated non-editable portion of the data set.

20 Claims, 15 Drawing Sheets

(56) References Cited

U.S. PATENT DOCUMENTS

| | | |
|---|---|---|
| 10,380,134 B2 | 8/2019 | Su et al. |
| 11,113,261 B2 | 9/2021 | Pilz et al. |
| 11,113,264 B2 | 9/2021 | Rittinger |
| 11,829,437 B2 | 11/2023 | Goldstein et al. |
| 2007/0078528 A1 | 4/2007 | Anke et al. |
| 2013/0332813 A1 | 12/2013 | Heinrich et al. |
| 2015/0149259 A1 | 5/2015 | Song |
| 2017/0076101 A1 | 3/2017 | Kochhar et al. |
| 2017/0315979 A1 | 11/2017 | Boucher et al. |
| 2018/0181552 A1 | 6/2018 | Konnola et al. |
| 2018/0335935 A1 | 11/2018 | Larson et al. |
| 2019/0303545 A1 | 10/2019 | Huang et al. |
| 2023/0098745 A1* | 3/2023 | Rittinger ............ G06F 21/6209 726/28 |

OTHER PUBLICATIONS

Non-Final Office Action in U.S. Appl. No. 17/647,564, mailed on Dec. 29, 2023, 15 pages.

Wikipedia.org [online], "Customer demand planning" created on May 2008, [retrieved on Dec. 29, 2021], retrieved from URL <https://en.wikipedia.org/wiki/Customer_demand_planning>, 1 page.

Wikipedia.org [online], "Document collaboration" created on Jan. 2006, [retrieved on Dec. 29, 2021], retrieved from URL <https://en.wikipedia.org/wiki/Document_collaboration>, 2 pages.

Wikipedia.org [online], "Version Control" created on Jun. 2002, [retrieved on Dec. 29, 2021], retrieved from URL <https://en.wikipedia.org/wiki/Version_control>, 6 pages.

Final Office Action in U.S. Appl. No. 17/647,564, mailed on May 17, 2024, 11 pages.

\* cited by examiner

302 — Read/Write permissions managed for dimension Region

303 — Region

| ID | READ | WRITE |
|---|---|---|
| World | A, Admin | Admin |
| Europe | B | |
|   Germany | | A |
|   France | | B |
| America | | |
|   USA | | A |

- 304 — World
- 306 — Europe
- 308 — Germany
- 312 — France
- 310 — USA

320 — (Effective privileges are recursively unfolded, see non-underlined below)

Region

| ID | READ | WRITE |
|---|---|---|
| World | A, Admin | Admin |
| Europe | B, A, Admin | Admin |
|   Germany | A, B, Admin | A, Admin |
|   France | A, B, Admin | B, Admin |
| America | A, Admin | Admin |
|   USA | A, Admin | A, Admin |

340 — Data Locking permissions

| | | Version 342 | 346 | 348 | 350 |
|---|---|---|---|---|---|
| Time 344 | Region | Actual | Budget 21 | Forecast 22 | |
| 2020 | World | Locked | Locked | Locked | |
| 2021 | World | Locked | Mixed | Locked | |
| | Europe | Locked | Open | Locked | |
| | America | Locked | Locked | Locked | |
| 2022 | World | Open | Open | Open | |

Data Snapshot of Public Data for user Admin (can read & write everything)

| Measure | | | | | | | | |
|---|---|---|---|---|---|---|---|---|
| Time | Sales Region | Version Actual | Budget 21 | Forecast 22 | MyActual | MyBudget | MyForecast | MyRestrFcst |
| 2020 | World | 440 | --- | --- | 440 | --- | --- | --- |
| | Europe | 190 | --- | --- | 190 | --- | --- | --- |
| | Germany | 100 | --- | --- | 100 | --- | --- | --- |
| | France | 90 | --- | --- | 90 | --- | --- | --- |
| | America | 250 | --- | --- | 250 | --- | --- | --- |
| | USA | 250 | 255 | 260 | 250 | 255 | 260 | 260 |
| 2021 | World | 458 | 480 | 480 | 458 | 480 | 480 | 480 |
| | Europe | 183 | 210 | 210 | 183 | 210 | 210 | 210 |
| | Germany | 95 | 110 | 110 | 95 | 110 | 110 | 110 |
| | France | 88 | 100 | 100 | 88 | 100 | 100 | 100 |
| | America | 275 | 270 | 270 | 275 | 270 | 270 | 270 |
| | USA | 275 | 270 | 270 | 275 | 270 | 270 | 270 |
| 2022 | World | --- | 510 | 528 | --- | 510 | 528 | 528 |
| | Europe | --- | 220 | 231 | --- | 220 | 231 | 231 |
| | Germany | --- | 115 | 121 | --- | 115 | 121 | 121 |
| | France | --- | 105 | 110 | --- | 105 | 110 | 110 |
| | America | --- | 290 | 297 | --- | 290 | 297 | 297 |
| | USA | --- | 290 | 297 | --- | 290 | 297 | 297 |

MyActual is a snapshot of Actual version based on planning area for WRITE permission of dimension Region
 Initial filter is: Region in (Germany, France, Europe, USA, America, World)
 Effective filter are: none MyBudget is a snapshot of version Budget 21 based on planning area for data locking
 Initial filter is: (Region in (Germany, France, Europe) and Time=2021) or (Region in (Germany, France, Europe, USA, America, World) and Time=2022)
 Effective filter is: Time in (2021, 2022)

MyForecast is a snapshot of version Forecast 22 based on planning area for WRITE permission of dimension Region and data locking
 Initial filter is: Region in (Germany, France, Europe, USA, America, World) and ((Region in (Germany, France, Europe) and Time=2021)
 or (Region in (Germany, France, Europe, USA, America, World) and Time=2022))
 Effective filter is: Time in (2021, 2020)

MyRestrFcst is a snapshot of version Forecast 22 based on a cell context (L171.22) in the grid when creating the version
 Initial filter is: Region in (Germany, France, Europe, USA, America, World) and Time (2022)
 Effective filter is: Time in (2022)

FIG. 4

Data Snapshot of Public Data for user A (can read & write everything)

| Measure Time | Sales Region | Version Actual | Budget 21 | Forecast 22 | MyActual | MyBudget | MyForecast |
|---|---|---|---|---|---|---|---|
| 2020 | World | 440 | -- | -- | 440 | -- | -- |
|  | Europe | 190 | -- | -- | 190 | -- | -- |
|  | Germany | 100 | -- | -- | 100 | -- | -- |
|  | France | 90 | -- | -- | 90 | -- | -- |
|  | America | 250 | -- | -- | 250 | -- | -- |
|  | USA | 250 | -- | -- | 250 | -- | -- |
| 2021 | World | 458 | 255 | 260 | 458 | 255 | 260 |
|  | Europe | 183 | 480 | 480 | 183 | 480 | 480 |
|  | Germany | 95 | 210 | 210 | 95 | 210 | 210 |
|  | France | 88 | 110 | 110 | 88 | 110 | 110 |
|  | America | 275 | 100 | 100 | 275 | 100 | 100 |
|  | USA | 275 | 270 | 270 | 275 | 270 | 270 |
| 2022 | World | -- | 270 | 270 | -- | 270 | 270 |
|  | Europe | -- | 510 | 528 | -- | 510 | 528 |
|  | Germany | -- | 220 | 231 | -- | 220 | 231 |
|  | France | -- | 115 | 121 | -- | 115 | 121 |
|  | America | -- | 105 | 110 | -- | 105 | 110 |
|  | USA | -- | 290 | 297 | -- | 290 | 297 |

MyActual is a snapshot of Actual version based on planning area for WRITE permission of dimension Region — 518
 Initial filter is: Region in (Germany, USA) — 520
 Effective filter is: Region in (Germany, USA) — 522

MyBudget is a snapshot of version Budget 21 based on planning area for data locking — 524
 Initial filter is: (Region in (Germany, France, Europe) and Time=2021) or (Region in (Germany, France, Europe, USA, America, World) and Time=2022) — 526
 Effective filter is: Time in (2021, 2022) — 528

MyForecast is a snapshot of version Forecast 22 based on planning area for WRITE permission of dimension Region and data locking — 530
 Initial filter is: Region in (Germany, USA) and ((Region in (Germany, France, Europe) and Time=2021)
 or (Region in (Germany, France, Europe, USA, America, World) and Time=2022)) — 532
 Effective filter are: [Region in (Germany, USA), Time in (2021, 2020)] — 534

FIG. 5

Data Snapshot of Public Data for user B (can read only in Europe)

| Measure | | Sales | | | | | |
|---|---|---|---|---|---|---|---|
| Time | | Version | Actual | Budget 21 | Forecast 22 | MyActual | MyBudget | MyForecast |
| | | Region | | | | | | |
| 2020 | Europe | | 190 | --- | --- | 190 | --- | --- |
| | Germany | | 100 | --- | --- | 100 | --- | --- |
| | France | | 90 | --- | --- | 90 | --- | --- |
| 2021 | Europe | | 183 | 210 | 210 | 183 | 210 | 210 |
| | Germany | | 95 | 110 | 110 | 95 | 110 | 110 |
| | France | | 88 | 100 | 100 | 88 | 100 | 100 |
| 2022 | Europe | | --- | 220 | 231 | --- | 220 | 231 |
| | Germany | | --- | 115 | 121 | --- | 115 | 121 |
| | France | | --- | 105 | 110 | --- | 105 | 110 |

MyActual is a snapshot of Actual version based on planning area for WRITE permission of dimension Region — 618
  Initial filter is: Region in (France) — 622
  Effective filter is: Region in (France) — 624
MyBudget is a snapshot of version Budget 21 based on planning area for data locking — 626
  Initial filter is: (Region in (Germany, France, Europe) and Time=2021) or (Region in (Germany, France, Europe, USA, America, World) and Time=2022) — 630
  Effective filter is: Time in (2021, 2022)
MyForecast is a snapshot of version Forecast 22 based on planning area for WRITE permission of dimension Region and data locking — 632
  Initial filter is: Region in (France) and ((Region in (Germany, France, Europe) and Time=2021) or (Region in (Germany, France, Europe, USA, America, World) and Time=2022)) — 634
  Effective filter are: (Region in (France), Time in (2021, 2020)); (Region in (France), Time=2022))

| | CHANGE OF CELL FOR<br>(SALES IN UNITED STATES, 2014) | | | |
| --- | --- | --- | --- | --- |
| | ADJUSTED FILTER: REGION =<br>UNITED STATES AND TIME IN (2013, 2014) | | | |
| | | | | |
| | DATA COPY | | | |
| | | | | |
| | REGION | TIME | SALES | |
| | UNITED STATES | 2013 | 1 | ～944a |
| | UNITED STATES | 2014 | 1 | ～944b |
| | | | | |
| | | | | |
| | | | | |
| | | | | |
| | | | | |
| | VIEW | | | |
| | REGION | TIME | SALES | |
| | UNITED STATES | 2013 | 1 | ～920 |
| | UNITED STATES | 2014 | 1 | ～948 |
| | CANADA | 2013 | 1 | |
| | CANADA | 2014 | 1 | |
| | GERMANY | 2013 | 1 | |
| | GERMANY | 2014 | 1 | |
| | ITALY | 2013 | 1 | ～950 |
| | ITALY | 2014 | 1 | |

942 — second row
944 — DATA COPY section
946 — VIEW section

| | CHANGE OF CELL FOR (SALES IN ITALY, 2013) | | | |
|---|---|---|---|---|
| 972 | ADJUSTED FILTER: REGION IN (UNITED STATES, ITALY) AND TIME IN (2013, 2014) | | | |
| | | | | |
| | DATA COPY | | | |
| | | | | |
| | REGION | TIME | SALES | |
| 974 | UNITED STATES | 2013 | 1 | ~944a |
| | UNITED STATES | 2014 | 1 | ~944b |
| | ITALY | 2013 | 1 | ~974a |
| | ITALY | 2014 | 1 | ~974b |
| | | | | |
| | | | | |
| | | | | |
| | | | | |
| | VIEW | | | |
| | REGION | TIME | SALES | |
| | UNITED STATES | 2013 | 1 | ~920 |
| | UNITED STATES | 2014 | 1 | ~948 |
| 976 | CANADA | 2013 | 1 | |
| | CANADA | 2014 | 1 | |
| | GERMANY | 2013 | 1 | |
| | GERMANY | 2014 | 1 | |
| | ITALY | 2013 | 1 | ~978 |
| | ITALY | 2014 | 1 | ~980 |

| CHANGE OF CELL FOR (SALES IN UNITED STATES, 2014) | | | |
|---|---|---|---|
| ADJUSTED FILTER: REGION = UNITED STATES AND TIME IN (2013, 2014) | | | |
| | | | |
| DATA COPY | | | |
| | | | |
| REGION | TIME | SALES | INTERNAL BOOKKEEPING — 1018 |
| UNITED STATES | 2013 | 1 | STEP 1: ORIGINAL — 1020 |
| UNITED STATES | 2013 | 9 | STEP 2: MODIFICATION — 1024 |
| UNITED STATES | 2014 | 1 | STEP 3: EXTENSION (2014) — 1048 |
| UNITED STATES | 2014 | 9 | STEP 4: MODIFICATION — 1056 |
| | | 1058 | |
| | | | |
| | | | |
| | | | |
| VIEW | | | |
| REGION | TIME | SALES | |
| UNITED STATES | 2013 | 10 — 1016 | |
| UNITED STATES | 2014 | 10 — 1052 | |
| CANADA | 2013 | 1 | |
| CANADA | 2014 | 1 | |
| GERMANY | 2013 | 1 | |
| GERMANY | 2014 | 1 | |
| ITALY | 2013 | 1 — 1060 | |
| ITALY | 2014 | 1 | |

FIG. 10B

CHANGE OF CELL FOR (SALES IN ITALY, 2013)

ADJUSTED FILTER: REGION IN (UNITED STATES, ITALY) AND TIME IN (2013, 2014)

DATA COPY

| REGION | TIME | SALES | | |
|---|---|---|---|---|
| UNITED STATES | 2013 | 1 | INTERNAL BOOKKEEPING | |
| UNITED STATES | 2013 | 9 | STEP 1: ORIGINAL | |
| UNITED STATES | 2014 | 1 | STEP 2: MODIFICATION | <-- FUNCTIONAL DEPENDENCY OF STEP 2 ON STEPS 1 |
| UNITED STATES | 2014 | 9 | STEP 3: EXTENSION (2014) | |
| ITALY | 2013 | 1 | STEP 4: MODIFICATION | <-- FUNCTIONAL DEPENDENCY OF STEP 4 ON STEPS 1..3 |
| ITALY | 2014 | 1 | STEP 5: EXTENSION (ITALY) | |
| ITALY | 2013 | 9 | STEP 5: EXTENSION (ITALY) | |
| | | | STEP 6: MODIFICATION | <-- FUNCTIONAL DEPENDENCY OF STEP 6 ON STEPS 1..5 |

VIEW

| REGION | SALES | |
|---|---|---|
| UNITED STATES | 2013 | 10 |
| UNITED STATES | 2014 | 10 |
| CANADA | 2013 | 1 |
| CANADA | 2014 | 1 |
| GERMANY | 2013 | 1 |
| GERMANY | 2014 | 1 |
| ITALY | 2013 | 10 |
| ITALY | 2014 | 1 |

FIG. 10C

AUTOMATIC EXTENSION OF A PARTIALLY-EDITABLE DATASET COPY

CLAIM OF PRIORITY

This application claims priority under 35 USC § 119 (e) to U.S. Patent Application Ser. No. 63/621,315, filed on Jan. 16, 2024, titled "AUTOMATIC EXTENSION OF A PARTIALLY-EDITABLE DATASET COPY"; the entire contents of which are hereby incorporated by reference.

TECHNICAL FIELD

The present disclosure relates to computer-implemented methods, software, and systems for automatically extending a partially-editable dataset copy.

BACKGROUND

In an organization, different approaches can be used when multiple users want to edit the same document or data set. In one example, a given user can check out the document or data set which can allow that user to edit the document or data set and prevent other users from editing the document or data set. The user can check in the document or data set when the user is done editing the document or data set. As another example, some systems can allow collaborative concurrent editing of a same central document.

SUMMARY

The present disclosure involves systems, software, and computer implemented methods for automatically extending a partially-editable dataset copy. One example method includes: identifying, for a data set, extension filter criteria that extends a current filter that defines an editable portion of the data set, wherein the editable portion of the data set corresponds to a partially-editable copy of the data set; obtaining the current filter for the data set; automatically generating an extended filter for the data set based on the extension filter criteria and the current filter; copying additional data into the partially-editable copy of the data set based on the extended filter and the current filter to generate an updated partially-editable copy of the data set; replacing the current filter for the data set with the extended filter to create a new current filter; and updating an exposed view for the partially-editable copy of the data set based on the new current filter to generate an updated exposed view that exposes the updated partially-editable copy of the data set and an updated non-editable portion of the data set.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 is a diagram that illustrates example configurations that are discussed in later planning area examples.

FIG. 4 illustrates data snapshots for an admin user.

FIG. 5 illustrates data snapshots for a first user.

FIG. 6 illustrates data snapshots for a second user.

FIGS. 9A-9C are diagrams that illustrate automatic extension of a partially-editable dataset copy.

FIGS. 10A-10C are diagrams that illustrate automatic extension of a partially-editable dataset copy.

DETAILED DESCRIPTION

Figure 1:
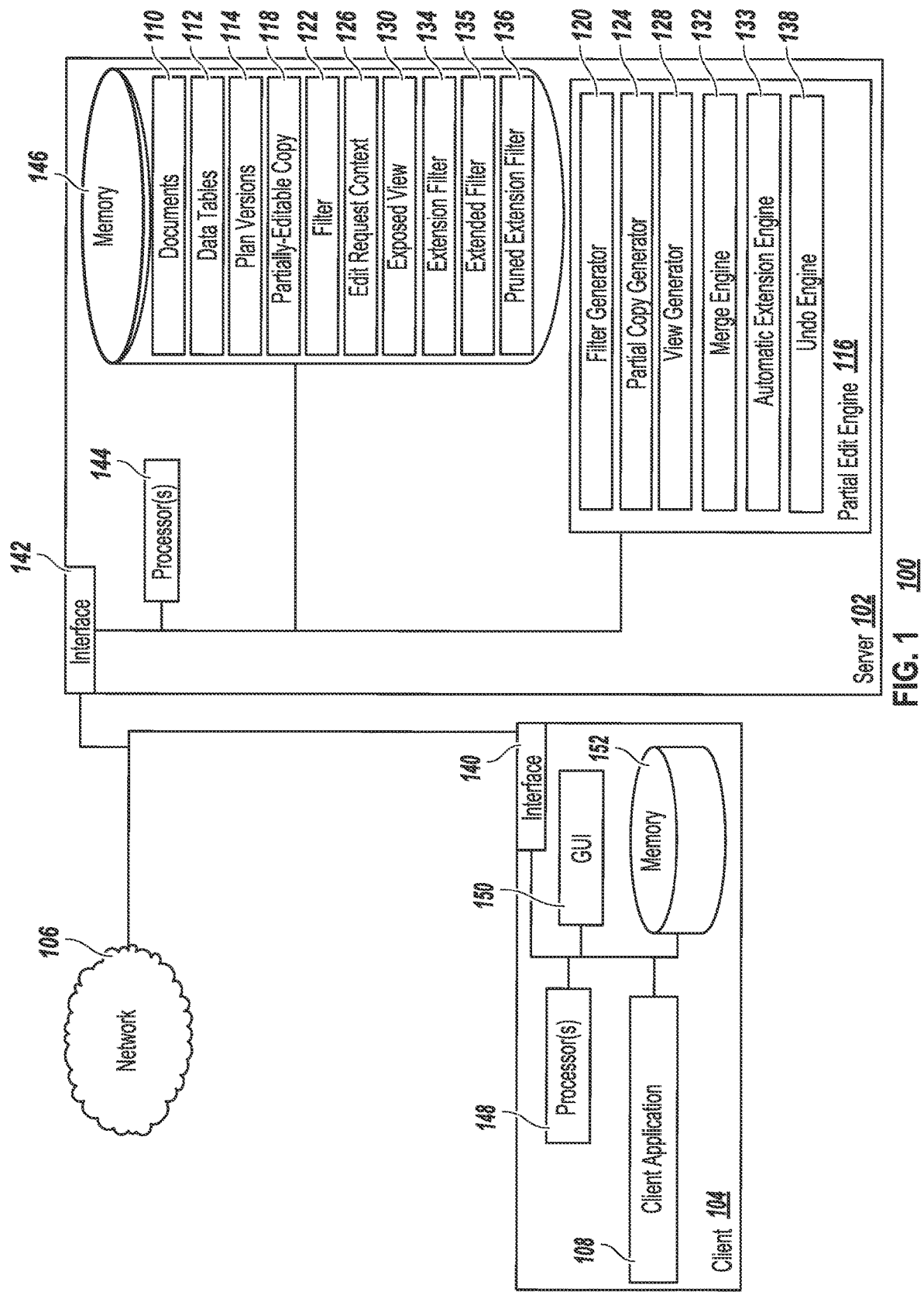
FIG. 1 is a block diagram illustrating an example system for automatically generating a partially-editable dataset copy.

In an organization, different approaches can be used when multiple users edit the same document or data set. In one example, a given user can check out the document or data set which can allow that user to edit the document or data set and prevent other users from editing the document or data set. As another example, some systems can allow collaborative concurrent editing of a same central document.

However, for some situations, users may require or desire more fine-grained controlled access to data sets. For example, a user may only need or desire access to a particular paragraph, section, or data slice of a data set. Locking an entire document may be overkill if the user only desires access to a portion of the data set. Additionally, in some cases, a user may copy a data set when working on the data set. Copying the entire data set when the user is only interested in working on a portion of the data set is not an efficient use of resources.

To improve efficiency and enable editing of portions of data sets, a partial edit engine can use a filter criterion to distinguish between an editable and non-editable portion of a data set. The filter can be used to create an editable subset of the data set. The editable subset of the data set can be presented in a view that also includes data of the data set that do not match the filter criterion. The user may desire to see non-editable data for reference, for example. The view can ensure that any data modified using the view matches the filter.

The partial edit engine can obtain various advantages. For example, when documents being edited are copied from a central data set, copying only editable portions into a partially-editable copy saves both processing and space resources. Additionally, performance of a view used for editing a data set can be improved, due to reduction in input enablement support for a fewer number of data cells. Additionally, queries, to populate or update an editable portion can be performed faster, as compared to queries that are based on an entire data set. With the solution, exclusive locks can affect smaller data regions and thus allow more parallelism. Additionally, conflict resolution checking for data writeback in parallel edits can be faster and require fewer processing resources due to decreased affected data region. As another example, changes of data outside of filtered data region by other users can be visible while a given user is editing a data set.

While editing a data set using a partially-editable copy, a user may desire or realize a need to edit data outside of the current filter of the partially-editable copy. Defining the initial filter for the partially-editable copy can be challenging in some cases, for example, because the current filter can represent a prediction of data or data portions that a user might want to edit. A user may, after realizing a need to edit data outside of a current filter, stop and exit a current edit session and restart a partial edit process so that a new filter can be defined for a new partially-editable copy. However, such an approach can require a user to stop the current edit session so that the partial edit process can be restarted with a new filter. An improved alternative approach can be used, however, in which a current filter of a current partially-editable copy is automatically extended, without requiring the user to leave the current edit session. Accordingly, a user experience can be improved by providing a smoother user experience that allows the user to edit data outside of a current filter without leaving the current edit session.

As another example, an alternative approach to automatic filter extension can be to initially provide a larger partially-editable copy as compared to other approaches that produce a smaller partially-editable copy based on an initially-determined filter. The larger partially-editable copy may include data outside the initially-determined filter that the user might want to edit. However, using an overly-conservative approach of creating a larger partially-editable copy generally erodes the performance benefits described herein of having a smaller partially-editable copy, as more resources are required to prepare a larger partially-editable copy for the user. With the automatic extension approach, in contrast, the system can avoid larger partial edit copies that cause more runtime overhead since the system does not need to be prepared for all possible modifications from the start of the partial edit process. Further details and advantages of automatic extension of partially-editable copies are described below.

FIG. 1 is a block diagram illustrating an example system 100 for automatically generating a partially-editable dataset copy. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system or server may be provided by multiple systems or servers.

A user can use a client application 108 on the client device 104, to view and edit data, such as data provided by the server 102. For example, the user can use the client application 108 to view or edit data in a copy of a document 110, data from a data table 112, from a file, or from another type of data set. As a particular example, the client application 108 can be a planning application that can be used to perform planning by viewing or editing planning data that is stored in plan versions 114. Plan versions 114 can enable storing of separate sets of plan data for the same profit center, for example. For instance, different plan versions 114 can be used for an operational plan, a strategic plan, an optimistic plan, and/or a pessimistic plan, to name few examples.

When a user edits a data set (e.g., document, data table, plan version), the user may only be interested in editing a portion of the data set. For example, the user may only be interested in modifying a certain section of the document or data table, or may be interested in only working on certain data in a plan version 114. A partial edit engine 116 described herein can be used to create a partially-editable copy 118 of a data set. A filter generator 120 can generate a filter 122 that can be used to create the partially-editable copy 118, for example, as described in more detail below.

For instance, with planning versions, a user may create a private plan version which can include a snapshot of a public plan version. While planning with the private version, the user can plan without being affected by changes performed by other users. Accordingly, the user can perform planning simulations independently of other users. When creating the private plan version, data from the public version can be copied into the private version. To improve performance, a partial copy generator 124 of the partial edit engine 116 can use the filter 122 to create the partially-editable copy 118 that is a subset of a public planning version that includes data that matches the filter 122. Similar approaches can be used for other types of data sets, such as documents, data tables, files, etc.

In general, the filter generator 120 can determine the filter 122 based on context information 126 for an edit request of a data set. The filter 122 can define an editable portion of the data set. The context information 126 for the edit request can include, for example, requested dimension(s) to edit, a role of the user, preconfigured data access permissions for the user (which can be determined based on the role), preconfigured data locking permissions, or other types of context information that are described in more detail below with respect to FIG. 2.

As a particular example, when the context information 126 includes data access configurations, the filter generator 120 can define the filter 122 so that the filter 122 can be used by the partial copy generator 124 to retrieve data for which the user has write access. As another example, when the context information 126 includes data locking configurations, the filter generator 120 can define the filter 122 so that the filter 122 can be used by the partial copy generator 124 to retrieve data that is unlocked. In general, for a given data set, the partial copy generator 124 can use the filter 122 to generate the partially-editable copy 118 that includes an editable portion of the data set. Particularly, the partial copy generator 124 can copy portions of the data set that match the filter 122 into the partially-editable copy 118.

When the data set is a public plan version, the partially-editable copy 118 can be a private plan version that includes a recommended planning area (e.g., where the recommended planning area is determined based on the filter 122 that is generated based on the context information 126). Planning using the recommended planning area can improve performance as compared to planning using a private plan version that is a full copy of a public plan version. Similar performance gains can be obtained when the partially-editable copy 118 is an editable portion of other types of data sets.

To enable editing of the partially-editable copy 118, a view generator 128 can generate an exposed view 130 that exposes both the partially-editable copy 118 of the data set and a non-editable portion of the data set. The non-editable portion of the data set exposed by the exposed view 130 can be identified (or generated) using a negation of the filter 122. The exposed view 130 can enable the user to see both editable data in the partially-editable copy 118 and other non-editable data (e.g., for reference) without having to switch views or contexts.

As described below, various approaches can be used to ensure that the exposed view 130 is used for editing only data in the partially-editable copy 118 and not other data. For example, the exposed view 130 can explicitly prevent users from modifying data in the non-editable portion. As another example, the exposed view 130 can include or request functionality that determines whether a data item being modified matches the filter 122. If the data item being modified matches the filter 122, the modification can be accepted. If the data item being modified does not match the filter 122, the modification can be rejected and the user can be notified. For instance, the exposed view 130 can notify the user that planning outside of a recommended planning area is not allowed. In summary, different approaches, including up-front prevention or "lazy" checking (e.g., initially allow an edit but prevent ultimate saving in a later step) can be performed. In examples below, "disabling editing" or other descriptions can refer to any suitable approach, including up-front or lazy approaches).

For some data sets, such as planning versions, multiple copies of the data set (e.g., multiple private versions) may be being edited by multiple users. A merge engine 132 can resolve merging of changes in multiple partially-editable copies of a data set back into a central data set. For planning versions, the merge engine can analyze the public version from which a private version was generated, that particular private version, and other private versions previously checked in that may have had modifications that overlap those done for the particular private version.

An automatic extension engine 133 can automatically extend the filter 122 of the partially-editable copy 118. In further detail, the automatic extension engine 133 can identify an extension filter 134 for use in automatic filter extension. For example, the automatic extension engine 133 can determine or predict a user's desire, intent, and/or attempt to edit data outside of the partially-editable copy 118. The extension filter 134 can include filter criteria that identifies the data the automatic extension engine 133 determined or predicted that the user desired, intended, or attempted to edit. The automatic extension engine 133 can generate an extended filter 135 by combining a current version of the filter 122 and the extension filter 134, as described in more detail below. In some cases, the automatic extension engine 133 can perform further optimizations to create, for example, a pruned extension filter 136 from the extended filter 135. The automatic extension engine 133 can replace a current version of the filter 122 with the pruned extension filter 136 (or the extended filter 135 if no optimizations of the extended filter 135 are performed) to create a new version of the filter 122. The automatic extension engine can save a copy of the current version of the filter 122 before the filter is replaced with the new version.

After the filter 122 is updated to a new version, the automatic extension engine 133 can update the partially-editable copy 118 based on the prior and new versions of the filter 122. For example, the automatic extension engine 133 (and/or the partial copy generator 124) can copy data from the data set (e.g., from a document 110 or a data table 112) that matches the new version of the filter 122 that is not already included in the partially-editable copy. Additionally, the automatic extension engine 133 (and/or the view generator 128) can update the exposed view 130 so that that an updated exposed view 130 exposes both the updated partially-editable copy 118 of the data set and an updated non-editable portion of the data set (e.g., where the updated partially-editable copy 118 corresponds to the new version of the filter 122 and the updated non-editable portion corresponds to a negation of the new version of the filter 122). Accordingly, the automatic extension engine 133 can provide an improved user experience in the client application 108 by allowing the user to edit data outside of a current filter without leaving a current edit session of the client application 108.

As mentioned, prior versions of the filter 122 can be recorded (e.g., stored). Additionally, edits to the partially-editable copy 118 can be recorded. Such filter and data modification records can be used to support various undo functionality by an undo engine 138. For example, the undo engine 138 can, in response to a rollback request (e.g., which may arise from a request from the client application 108, an administrator action, or some automated system action), roll back data modifications and/or filter extensions. For instance, if the exposed view 130 displayed in or as the client application 108 supports state handling to undo and redo changes and modifications, then the extension of the partially-editable copy 118 can optionally be changed like any other state handling changes. For example, in response to an undo request to revert an automatic extension, the undo engine 138 can obtain and apply a prior version of the filter 122 (to generate a reverted partially-editable copy 118 and subsequently a reverted exposed view 130, as appropriate). The undo engine 138 can perform multiple undo operations using, for example, an undo stack.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 140 and 142 are used by the client device 104 and the server 102, respectively, for communicating with other systems in a distributed environment—including within the system 100—connected to the network 106. Generally, the interfaces 140 and 142 each comprise logic encoded in software and/or hardware in a suitable combination and operable to communicate with the network 106. More specifically, the interfaces 140 and 142 may each comprise software supporting one or more communication protocols associated with communications such that the network 106 or interface's hardware is operable to communicate physical signals within and outside of the illustrated system 100.

The server 102 includes one or more processors 144. Each processor 144 may be a central processing unit (CPU), a blade, an application specific integrated circuit (ASIC), a field-programmable gate array (FPGA), or another suitable component. Generally, each processor 144 executes instructions and manipulates data to perform the operations of the server 102. Specifically, each processor 144 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 146. In some implementations, the server 102 includes multiple memories. The memory 146 may include any type of memory or database module and may take the form of volatile and/or non-volatile memory including, without limitation, magnetic media, optical media, random access memory (RAM), read-only memory (ROM), removable media, or any other suitable local or remote memory component. The memory 146 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the client application 108. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 148. Each processor 148 included in the client device 104 may be a central processing unit (CPU), an application specific integrated circuit (ASIC), a field-programmable gate array (FPGA), or another suitable component. Generally, each processor 148 included in the client device 104 executes instructions and manipulates data to perform the operations of the client device 104. Specifically, each processor 148 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 150.

The GUI 150 of the client device 104 interfaces with at least a portion of the system 100 for any suitable purpose, including generating a visual representation of the client application 108. In particular, the GUI 150 may be used to view and navigate various Web pages, or other user interfaces. Generally, the GUI 150 provides the user with an efficient and user-friendly presentation of business data provided by or communicated within the system. The GUI 150 may comprise a plurality of customizable frames or views having interactive fields, pull-down lists, and buttons operated by the user. The GUI 150 contemplates any suitable graphical user interface, such as a combination of a generic web browser, intelligent engine, and command line interface (CLI) that processes information and efficiently presents the results to the user visually.

Memory 152 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 152 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
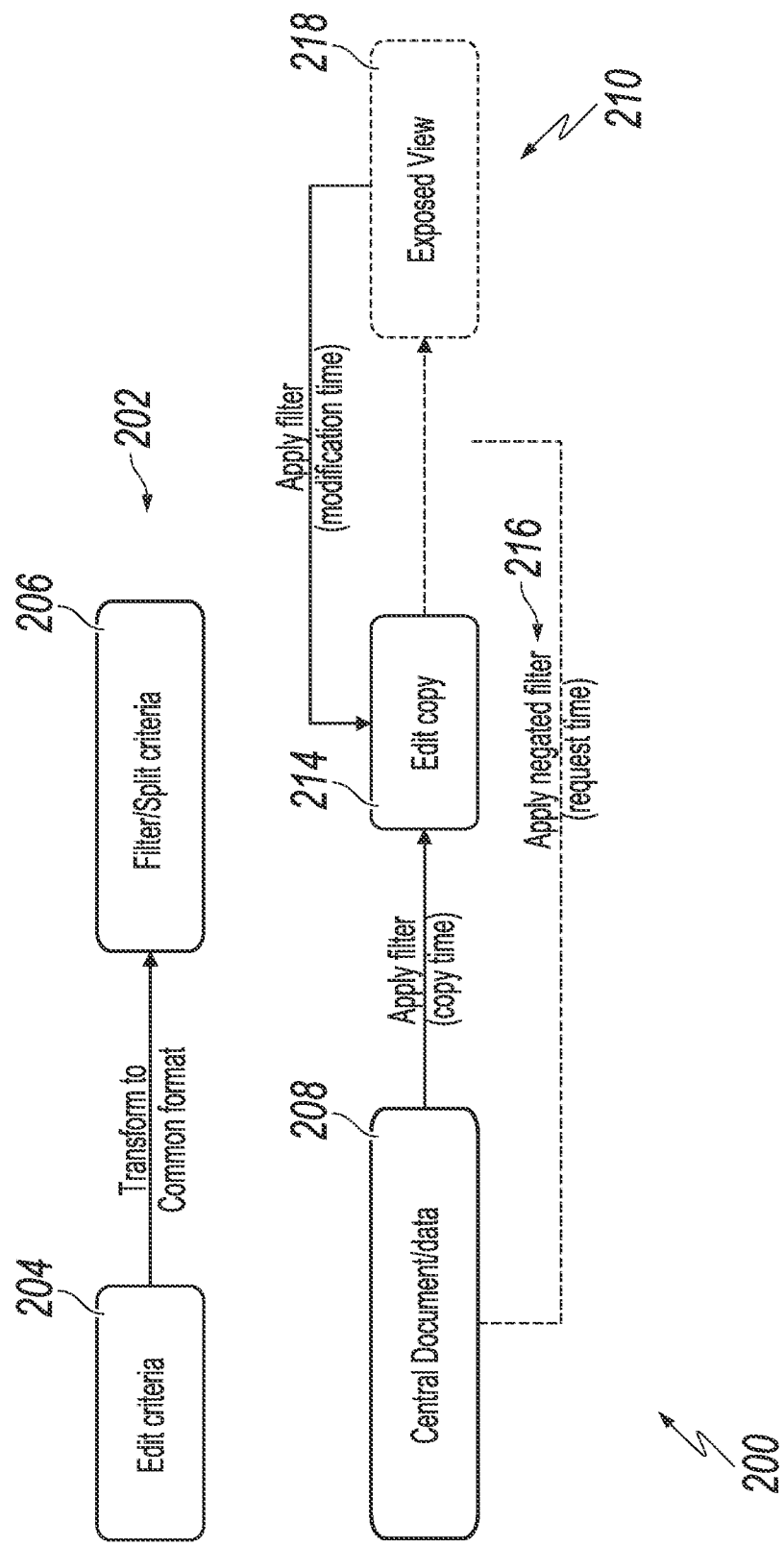
FIG. 2 illustrates flowcharts for creating a partially-editable data set.

FIG. 2 illustrates flowcharts 200 for creating a partially-editable data set. For example, as shown in a flowchart 202, an edit criteria 204 (e.g., a context of an edit request) can be transformed to a filter 206. The filter 206 can be used as a split criteria to filter a central data set 208. For example, as shown in a flowchart 210, the filter 206 can be applied to the central data set 208 to create a partially-editable copy 214 of the central data set 208. The filter 206 can define what areas of the central data set 208 are editable in the exposed view 218. When the central data set 208 is a planning version, the filter 206 can define a recommended planning area, for example. When the user is editing the partially-editable copy 214, a negated filter 216 (e.g., a negative of the filter 206) can be generated and applied to the central data set 208 to create an exposed view 218 that enables the user to view non-editable data that is not editable in the partially-editable copy 214.

There can be various types of edit criteria 204 or types of context of an edit request. For example, the edit criteria 204 can include data access control and/or data locking, as described in more detail below with respect to FIG. 3. Other examples of edit criteria or edit context can include one or more of a visible context (data that a user is currently viewing), user-specified filter criteria specified at edit time, a criteria previously defined by a modeling user for a data model of the central data set 208, or other types of edit criteria or edit context. When the central data set 208 is a document, the edit criteria 204 can be a semantic description of a portion of the document (such as a section name, a worksheet name, etc.).

The transformation illustrated in the flowchart 202 can be performed to shield end users from technical detail that may be used in the filter 206. For instance, the edit criteria 204 can be inferred from the context of an edit request and/or can be specified by the user using semantic references that the user is familiar with from use of a product. For example, the user can select known entities or artifacts (e.g., data locking, data access) that are exposed in the product to define a portion of the central data set 208 that the user wishes to edit. The filter transformation process illustrated in the flowchart 202 can transform semantic information specified by the edit criteria 204 into technical information that can be used to generate the partially-editable copy 214 from the central data set 208. In some cases, edit criteria 204 such as data locking and/or data access control can be preconfigured (e.g., before edit time) and the filter 206 can be generated based on the edit criteria 204 without further user interaction.

The exposed view 218 exposes the partially-editable copy 214 and a non-editable portion of the data set. For example, while the exposed view 218 can appear to display the complete central data set 208 (possibly with scrolling or drilling), the exposed view 218 can actually display an editable partially-editable copy 214 and a read-only non-editable portion. The non-editable portion can be made read-only in various ways. For example, the exposed view 218 can prohibit editing of the read-only portion. As another example, the exposed view 218 can generate an error message if the user attempts to edit the non-editable portion. The exposed view 218 can enable the user to see the partially-editable copy 214 along with the non-editable portion without switching context or user interfaces, for example. As a particular example, suppose application of the filter 206 enables the user to edit year 2022 data in the central data set 208. The exposed view 218 can include year 2021 data (among other data), for reference, so the user does not have to switch to another interface or switch context to view the year 2021 data.

The non-editable read-only portion in the exposed view 218 can be generated using a negation of the filter 206. For example, when the edit criteria 204 is or includes data locking, the filter 206 can be used to identify unlocked data of the central data set 208 to be included in the partially-editable copy 214 of the data set. A negation of the filter 206 can be used to identify locked data that can be included (e.g., as read-only data) in the exposed view 218.

In addition to generating the filter 206 from the edit criteria 204, a filter optimization process can be performed to optimize the filter 206. For example, the filter 206 can be analyzed for performance. If estimated performance of using the filter 206 (or using a negated filter that is a negation of the filter 206) is unacceptable, the filter optimization process can include identifying an alternate, or optimized filter, as a replacement for the filter 206. For example, in some cases, the filter 206 can be simplified. For instance, a relevance analysis can determine that some parts of the filter 206 are not relevant to a current data set or a current context and can be removed from the filter 206. In further detail, in some cases, to ensure that filters in a multi-dimensional data set on dimensions with a large list of members are not negatively affecting performance, some potentially expensive dimensions filters can be pruned from the filter 206. As another example, to ensure that use of the filter (e.g., during querying and user activity) is not negatively affecting performance, the filter 206 can be normalized into Cartesian filters on dimension member identifiers.

FIG. 3 is a diagram 300 that illustrates example configurations that are discussed in later planning area examples. For instance, a table 302 includes read and write permissions for a hierarchical region dimension 303, which can be based on user roles or other configurations. For example, a user A and an admin user have read permissions for a World region 304 and all its descendants (306, 308, 310, 312, and America). The admin user has write permissions for the World region 304 and all its descendants. The user A has write permissions for a Germany region 308 and a USA region 310. A user B has read permissions for a Europe region 306 (including 308 and 310). The user B has write permissions for a France region 312. A table 320 illustrates recursively unfolding of effective privileges along the hierarchy. For example, based on the read privileges of the user A and the admin user for the World region 304, both the user A and the admin user effectively have read privileges for every sub region of the World region 304.

When data access control is identified as a criteria to use when defining a filter, the filter can be based on the user's effective privileges. For example, a filter can be defined for a current user that identifies data from a data model that can be written by the current user. When the filter is applied to create a partially-editable copy of a data set, the copy can include data for which the current user has write access. As an example, for some data models, some users may be granted relatively broad read access and relatively narrow write access. By including only data to which a user has write access, the partially-editable copy of the data set can be substantially smaller than the entire data set.

A table 340 illustrates example configured data locking permissions for a hierarchical region dimension 342 and a time dimension 344. The table 340 includes data locking permissions for an actual version 346, a "budget 21" version 348, and a "forecast 22" version 350. For example, for the actual version 346, all combinations of time and region dimensions are configured as locked except for a combination of the year 2022 and the World region (e.g., as shown by an open data locking configuration 352). For the "budget 21" version 348, all combinations of time and region dimensions are configured as locked except for a combination of the year 2021 and the Europe region and a combination of the year 2022 and the World region (e.g., as shown by open data locking configurations 354 and 356, respectively). Similar to the actual version 346, for the "forecast 22" version 350, all combinations of time and region dimensions are configured as locked except for a combination of the year 2022 and the World region (e.g., as shown by an open data locking configuration 358).

When data locking is identified as a criteria to use when defining a filter, the filter can be based on the data locking configurations illustrated in the table 340. For example, since open data locking configurations can define which data areas of a data set are editable, using data locking configurations for a filter can reduce an amount of data included in a partially-editable copy of the data set.

FIG. 4 illustrates data snapshots 400 for an admin user. As described above with respect to FIG. 3, the admin user can both read and write data for a region dimension 402. An actual version 404, a "budget 21" version 406, and a "forecast 22" version 408 are public planning versions. A "MyActual" version 410, a "MyBudget" version 412, a "MyForecast" version 414, and a "MyRestrFcst" version 416 are each private versions with restricted planning area snapshots that are based on a public version.

For example, as indicated by a note 418, the "MyActual" version 410 is a snapshot of the actual version 404 that is based on a planning area for write permission of the region dimension 402. A filter 420 can be defined based on write permissions for the admin user as defined in the table 302. For instance, since the admin user has full write privileges, the filter 420 can be used to retrieve data for all regions. Other examples below discuss generation of an effective filter from an initial filter, but as indicated by a note 422, for the example of a planning area based on write permissions for the admin user, the filter 420 can be used.

As indicated by a note 424, the "MyBudget" version 412 is a snapshot of the "Budget 21" version 406 that is based on a planning area for data locking. An initial filter 426 can be defined, based on the data locking configurations illustrated in the table 340. For instance, the initial filter 426 can be used to retrieve unlocked European data for the year 2021 and unlocked data for the year 2022 for all regions. In some cases, the initial filter 426 can be transformed into an effective filter 428. The effective filter 428 can be more efficient, as described above for filter optimizations. The effective filter 428 can be generated, for example, using a Cartesian filtering approach in which it is determined that region dimensions can be removed. The effective filter 428 can thus retrieve data for any region for the years 2021 or 2022. The presentation of the "MyBudget" version 412 includes enabling (e.g., in an exposed view) editing of data for year 2021 or year 2022 and disabling editing of data for year 2020. Edits in USA for year 2021 succeed due to the effective filter. Data locking, however, if not performed lazily, may prohibit changes in a more fine-grained manner. For example, if data locking is not performed lazily and if a user attempts to edit non-European data for year 2021, an error message can be generated.

As indicated by a note 430, the "MyForecast" version 414 is a snapshot of the "Forecast 22" version 408 that is based on a planning area for write permission of the region dimension 402 and for data locking. An initial filter 432 can be generated based on both the data access permissions and the data locking configurations described above with respect to FIG. 3. The initial filter 432 can be transformed, using a filter optimization process, into a more simplified effective filter 434 (e.g., similar to the effective filter 428). The presentation of the "MyForecast" version 414 includes enabling (e.g., in an exposed view) editing of data for year 2021 or year 2022 and disabling editing of data for year 2020.

As indicated by a note 436, the "MyRestrFcst" version 416 is a snapshot of the "Forecast 22" version 408 that is based on a cell context (e.g., cells L17: L22, as illustrated inside of a rectangle 437) of a data grid when the version was created. An initial filter 438 can be generated based on data that is displayed in the cells L17: L22 of the displayed data grid. The initial filter 438 can be transformed, using a filter optimization process, into an effective filter 440 that matches data for year 2022 (e.g., similar to the effective filter 428).

The presentation of the "MyRestrFcst" version 416 can include enabling (e.g., in an exposed view) editing of data for year 2022 (e.g., as shown in a rectangle 441) and disabling editing of data for year 2020 or year 2021. A region 442 of cells highlighted in a first style that is a different style than used for the rectangle 441 can indicate a non-planning area in an exposed view, for example. Other areas of the data snapshots 400 (and other areas of other snapshots described below with respect to FIG. 5 and FIG. 6) are similarly styled using the first style, to indicate items in non-planning areas. As an example, in an exposed view, cells in a planning area may be styled using a white background and the first style for indicating cells in a non-planning area may be use of a gray background.

FIG. 5 illustrates data snapshots 500 for a first user. The first user can be the "user A" that, as described above with respect to FIG. 3, has read permission for regions in a region dimension that are included in a World region 502. The user A has write permissions for a Germany region 503 and a USA region 504. Similar to the example of FIG. 4, an actual version 505, a "budget 21" version 506, and a "forecast 22" version 508 are public planning versions. A "MyActual" version 510, a "MyBudget" version 512, and a "MyForecast" version 514 are each private versions with restricted planning area snapshots.

Similar to the example of FIG. 4, as indicated by a note 518, the "MyActual" version 510 is a snapshot of the actual version 505 that is based on a planning area for write permission of the region dimension 501. An initial filter 520 can be generated based on the write permissions for the first user. For example, the initial filter 520 can be used to retrieve data from the Germany region and the USA region for which the first user has write access. In this example, an effective filter 522 is the same as the initial filter 520 (e.g., no filter optimizations were performed). The effective filter 522 for the "user A" is different from the effective filter 422 for the administrative user, for a same semantic criteria of the planning area write permission for the dimension region. The presentation of the "MyActual" version 510 includes enabling (e.g., in an exposed view) editing of data for the Germany or USA regions and disabling of data outside of the Germany and USA regions.

As indicated by a note 524, the "MyBudget" version 512 is a snapshot of the "Budget 21" version 506 that is based on a planning area for data locking. Similar to the initial filter 426 described above with respect to FIG. 4, an initial filter 526 can be defined, based on the data locking configurations illustrated in the table 340. For instance, the initial filter 526 can be used to retrieve unlocked European data for the year 2021 and unlocked data for the year 2022 for all regions. The initial filter 526 can be transformed into an effective filter 528, as described above for the effective filter 428. The presentation of the "MyBudget" version 512 includes enabling (e.g., in an exposed view) editing of data for year 2021 or year 2022 and disabling editing of data for year 2020.

As indicated by a note 530, the "MyForecast" version 514 is a snapshot of the "Forecast 22" version 508 that is based on a planning area for write permission of the region dimension 501 and for data locking. An initial filter 532 can be generated based on both the data access permissions and the data locking configurations described above with respect to FIG. 3. The initial filter 532 can be transformed, using a filter optimization process, into a more simplified effective filter 534. For example, the initial filter 532 can be first transformed into a Cartesian filter with a first condition on dimension region and a second condition on region time.

The effective filter 534 for the "user A" is different from the effective filter 434 for the administrative user, for a same semantic criteria of the planning area for writer permission for the dimension region and data locking. The presentation of the "MyForecast" version 514 includes enabling (e.g., in an exposed view) disabling editing of data for year 2020 and enabling editing of data for year 2021 or year 2022 that is for either the Germany or USA regions.

FIG. 6 illustrates data snapshots 600 for a second user. The second user can be the "user B" that, as described above with respect to FIG. 3, has read permission for a Europe region 602 and write permission for a France region 604. The user B has write permission for a France region 604. Similar to the examples of FIG. 4 and FIG. 5, an actual version 605, a "budget 21" version 606, and a "forecast 22" version 608 are public versions. A "MyActual" version 610, a "MyBudget" version 612, and a "MyForecast" version 614 are each private versions with restricted planning area snapshots.

Similar to the examples of FIG. 4 and FIG. 5, as indicated by a note 618, the "MyActual" version 610 is a snapshot of the actual version 605 that is based on a planning area for write permission of the region dimension 601. An initial filter 620 can be generated based on the write permissions for the second user. For example, the initial filter 620 can be used to retrieve data from the France region 604. An effective filter 622 is the same as the initial filter 620 (e.g., no filter optimizations are applied). The effective filter 622 for the "user B" is different from the effective filter 422 for the administrative user and the effective filter 522 for the "user A", for a same semantic criteria of the planning area write permission for the dimension region. The presentation of the "MyActual" version 610 includes enabling (e.g., in an exposed view) editing of data for the France region and disabling editing of other data.

As indicated by a note 624, the "MyBudget" version 612 is a snapshot of the "Budget 21" version 606 that is based on a planning area for data locking. Similar to the initial filter 426 described above with respect to FIG. 4, an initial filter 626 can be defined, based on the data locking configurations illustrated in the table 340. For instance, the initial filter 526 can be used to retrieve unlocked European data for the year 2021 and unlocked data for the year 2022 for all regions. The initial filter 626 can be transformed into an effective filter 628, as described above for the effective filter 428. The presentation of the "MyBudget" version 612 includes enabling (e.g., in an exposed view) editing of data for year 2021 or year 2022 and disabling data for other years.

As indicated by a note 630, the "MyForecast" version 614 is a snapshot of the "Forecast 22" version 608 that is based on a planning area for write permission of the region dimension 601 and for data locking. An initial filter 632 can be generated based on both the data access permissions and the data locking configurations described above with respect to FIG. 3. The initial filter 632 can be transformed, using a filter optimization process, into a more simplified effective filter 634 (e.g., similar to the effective filter 534). The effective filter 634 for the "user B" is different from the effective filter 434 for the administrative user and the effective filter 534 for the "user A", for a same semantic criteria of the planning area for writer permission for the dimension region and data locking. The presentation of the "MyForecast" version 614 includes enabling (e.g., in an exposed view) editing of data for the France region that is for year 2021 or year 2022 and disabling editing of other data.

Figure 7:
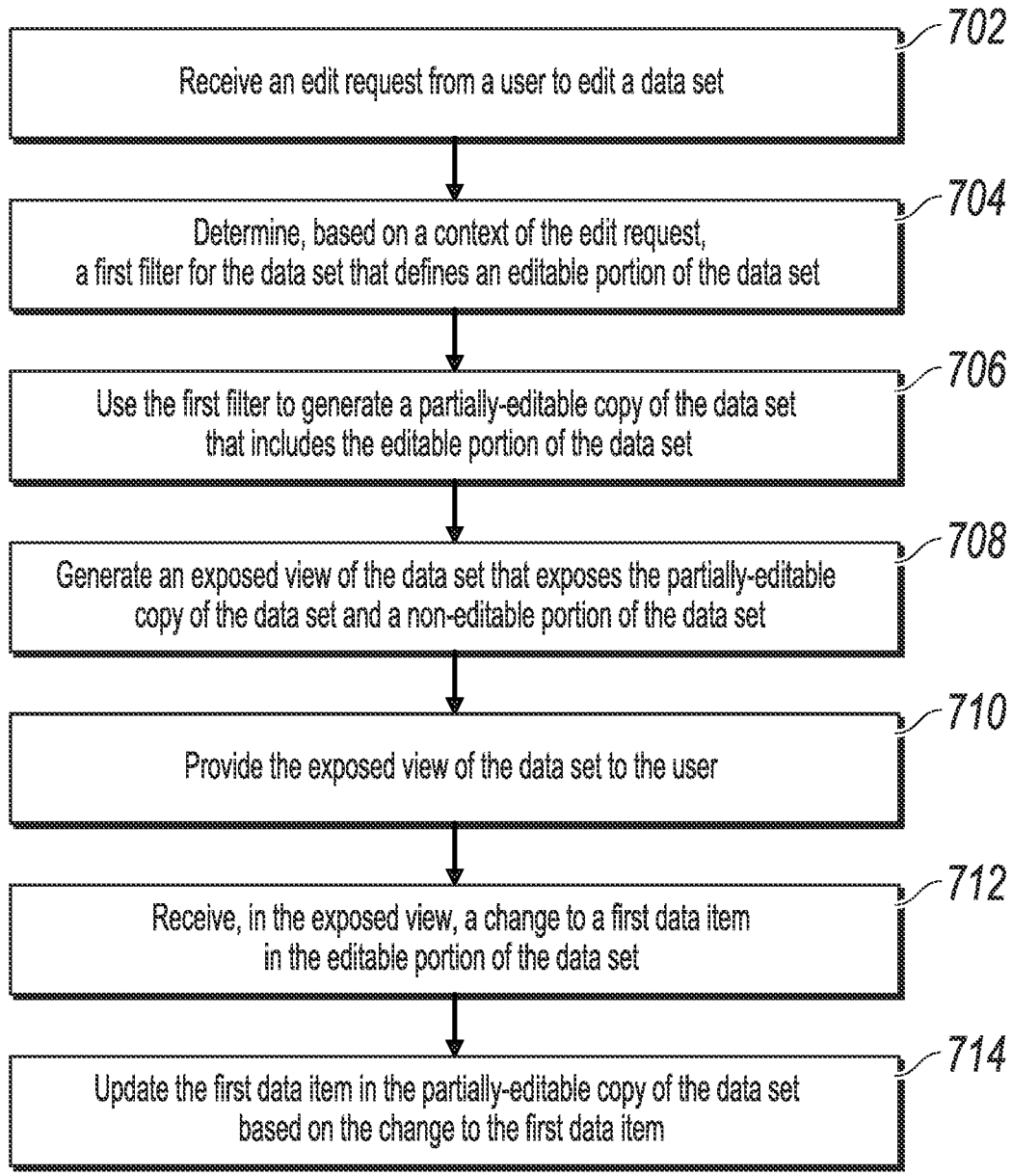
FIG. 7 is a flowchart of an example method for automatically generating a partially-editable dataset copy.

FIG. 7 is a flowchart of an example method 700 for automatically generating a partially-editable dataset copy. It will be understood that method 700 and related methods may be performed, for example, by any suitable system, environment, software, and hardware, or a combination of systems, environments, software, and hardware, as appropriate. For example, one or more of a client, a server, or other computing device can be used to execute method 700 and related methods and obtain any data from the memory of a client, the server, or the other computing device. In some implementations, the method 700 and related methods are executed by one or more components of the system 100 described above with respect to FIG. 1. For example, the method 700 and related methods can be executed by the partial edit engine 116 of FIG. 1.

At 702, an edit request to edit a data set is received from a user. The data set can be a document, a file, a data table, or a planning version, to name a few examples.

At 704, a first filter is determined for the data set, based on a context of the edit request, that defines an editable portion of the data set. A context of the edit request can include a user role. A user's role can determine data access restrictions or permissions or particular data locking configurations that may be in place for the user. For example, the edit request can be associated with one or more preconfigured specifications to use data locking, data access control, or another configuration when editing the data set. As another example, the context of the edit request can include a visible context of a particular visible portion of the data set. Other edit context examples include a story context or a user-specified semantic entity (e.g., a document section) that the user wishes to edit.

The first filter that is determined based on the data set can include technical information describing the editable portion that is generated based on a user's semantic specification. For example, a user's specification of a document section can be transformed into particular page and line number of a document. As another example, a configuration of data locking and a context of a particular dimension for the edit request can be transformed into a specification of dimension values that are not locked for the user. Similarly, a configuration of data access control and a context of a particular dimension for the edit request can be transformed into a specification of dimension values for which the user has write access.

At 706, the first filter is used to generate a partially-editable copy of the data set that includes the editable portion of the data set. For example, portions of the data set that match the first filter can be copied into the partially-editable copy of the data set.

At 708, an exposed view of the data set is generated that exposes the partially-editable copy of the data set and a non-editable portion of the data set. The non-editable portion of the data set exposed by the exposed view can be identified (or generated) using a negation of the first filter.

At 710, the exposed view of the data set is provided to the user. For example, the exposed view can be presented on a user interface of a user device.

At 712, a change to a first data item in the editable portion of the data set is received, in the exposed view. The first data item matches the first filter.

At 714, the first data item in the partially-editable copy of the data set is updated based on the change to the first data item. A determination can be made that the first data item matches the first filter before the first data item is updated.

In some cases, a change to a second data item that is included in the non-editable portion can be received (e.g., such as if the non-editable portion allows an attempt of an edit). A determination can be made that the second data item does not match the first filter. The change to the second data item can be rejected based on the second data item not matching the first filter.

Figure 8:
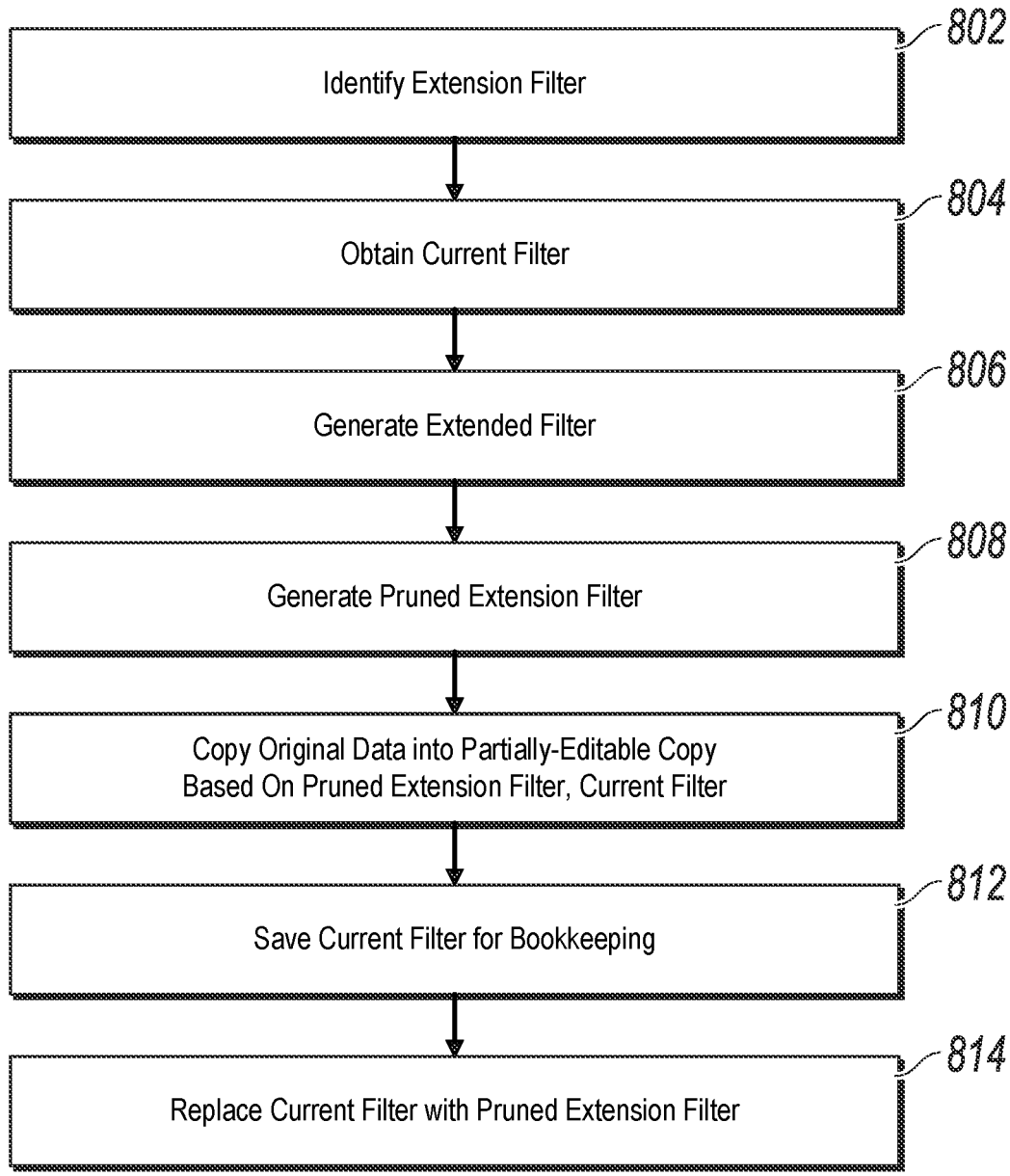
FIG. 8 is a flowchart of an example method for automatically extending a partially-editable dataset copy.

FIG. 8 is a flowchart of an example method 800 for automatically extending a partially-editable dataset copy. It will be understood that method 800 and related methods may be performed, for example, by any suitable system, environment, software, and hardware, or a combination of systems, environments, software, and hardware, as appropriate. For example, one or more of a client, a server, or other computing device can be used to execute method 800 and related methods and obtain any data from the memory of a client, the server, or the other computing device. In some implementations, the method 800 and related methods are executed by one or more components of the system 100 described above with respect to FIG. 1. For example, the method 800 and related methods can be executed by the automatic extension engine 133 of FIG. 1.

At 802, an extension filter is identified for a data set. The extension filter can be identified in response to a detection trigger. A detection trigger can be a trigger that is detected before data manipulation or a trigger that is detected during data manipulation. A detection trigger that is detected before data manipulation can correspond to detecting that a user is attempting to manipulate, or is about to attempt manipulation, of currently read-only data that is outside of data defined by a current filter. A detection trigger that is detected during or after data manipulation can correspond to detecting, after an edit occurs, that a user has modified data (e.g., in a local buffer) that is outside of data defined by the current filter. The current filter may define data for a year 2024, for example. The detection trigger can correspond to a user changing data to have a year value of 2025, for example. Accordingly, the identified extension filter can correspond to year 2025 in this example.

At 804, a current filter used for a partially editable copy is obtained. Using the example from above, a current filter of year 2024 can be obtained.

At 806, an extended filter is generated, where the extended filter is based on the current filter and the extension filter. Different approaches can be used to combine the current filter and the extension filter to create the extended filter, for example. For instance, the system can iterate over all filter criteria in the current filter, and can extend each criterion in the current filter with values from the extension filter for filter criteria that match between the current filter and the extension filter. For example, when the current filter corresponds to year 2024 and the extension filter corresponds to year 2025, the extended filter can correspond to a year dimension having values of 2024 or 2025. In general, the current filter and the extension filter can be combined based on corresponding matching parts, based on matching dimensions, keys, using Cartesian products, or using other approaches.

At 808, a pruned extension filter can optionally be generated based on the extended filter. That is, in some implementations, after the extended filter is generated based on the current filter and the extension filter, different optimizations may be performed, such as pruning any empty lists that may have been generated using a combination approach at step 806.

At 810, original data of the data set is copied into the partially-editable copy based on the pruned extension filter and the current filter. That is, data matching the pruned extension filter that is not already included in the partially-editable copy can be copied from the data set into the partially-editable copy.

At 812, the current filter is saved for bookkeeping purposes. For example, and as described in more detail below, the current filter can be saved to enable undo/redo operations.

At 814, the current filter for the partially-editable copy is replaced with the pruned extension filter, as a new filter for the partially-editable copy. The view for the partially-editable copy can be updated, to reflect the new filter. For example, data presented in the view that corresponds to data in the partially-editable copy can be presented as editable data.

Figure 9A:
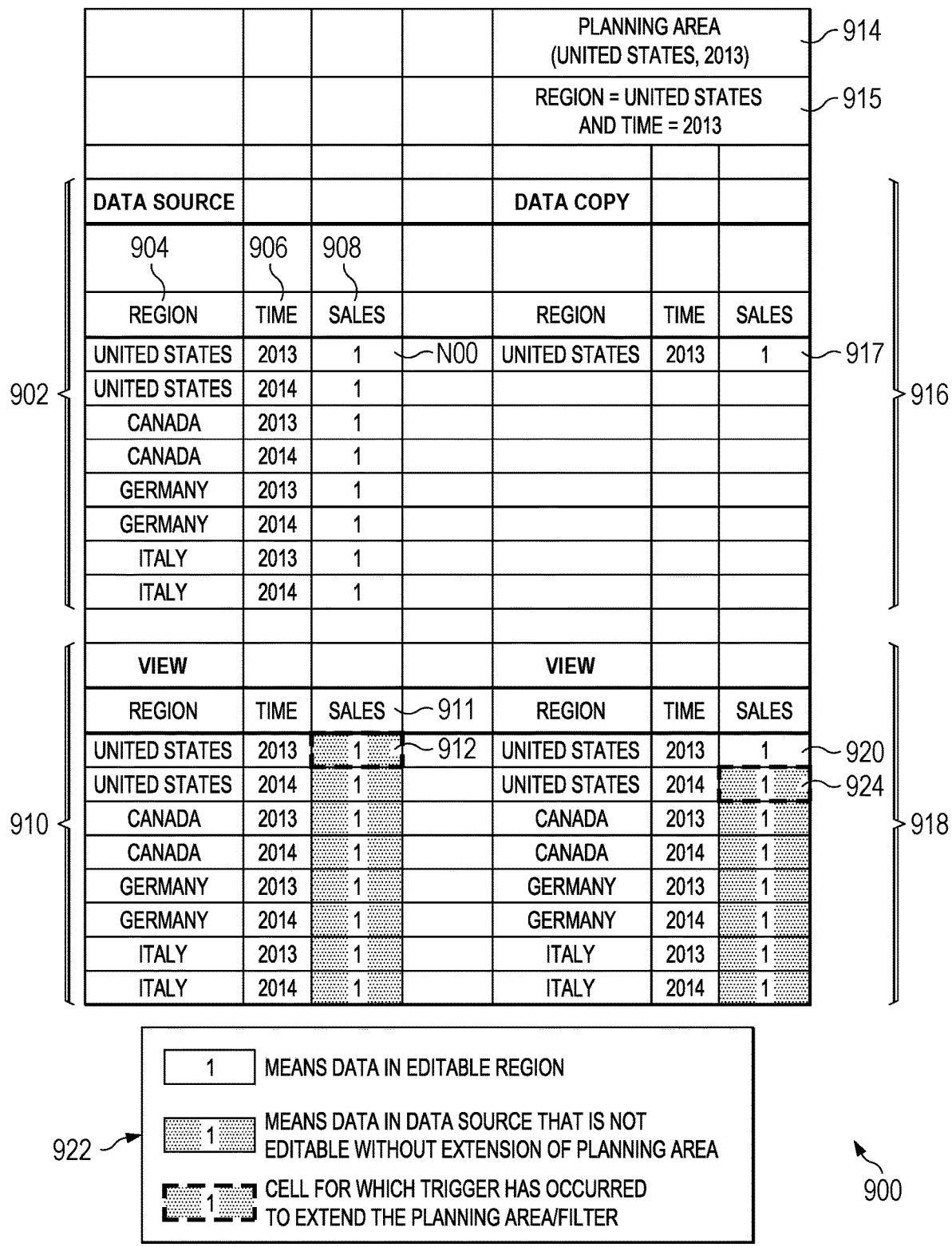

FIG. 9A is a diagram 900 that illustrates automatic extension of a partially-editable dataset copy. A data source 902 includes region 904, time 906, and sales 908 dimensions. The data source 902 can be a master copy used as a basis for partially-editable dataset copies, for example. An initial view 910 can be displayed to a user, for example. Cells 911 for sales values can be presented, but can be initially displayed as uneditable to the user. That is, no initial planning area/filter is applied for the view 910.

The system can determine that the user has either attempted to edit or predicts that the user may want to edit a cell 912 corresponding to sales for a US region and year 2013. Such a determination or prediction can be treated as a trigger to create an initial planning area/filter. Accordingly, the system can define a planning area 914 for region US and year 2013 using a filter 915.

The system can, in accordance with the filter 915, generate a data copy 916 that has data 917 just for region of US and year 2013. The system can generate and display a view 918 that is an updated view updated from the view 910. The view 918 has an editable cell 920 corresponding to sales for region of US and year 2013. The view 918 can accept any change of data for region of US and year 2013. Accordingly, the view 918 presents editable data from the data copy 916 (e.g., in the editable cell 920) and uneditable data from the data source 902 (e.g., in cells of the view 918 other than the editable cell 920).

As indicated in a legend 922, the editable cell 920 is displayed with a white background. Uneditable cells in the view 920 that are uneditable without extension of a filter are displayed with a shaded background. A cell, such as the cell 912 in the view 910 or a cell 924 in the view 918, can represent a cell for which a trigger (e.g., attempt or determined intent to edit) has occurred to extend the filter 915. For example, the system can determine that the user has attempted, is attempting, or can predict that the user may want to or desires to edit a value in the cell 924 for the region US and the year 2014. Accordingly, the system can automatically extend the filter 915, as described below.

FIG. 9B is a diagram 940 that illustrates automatic extension of a partially-editable dataset copy. In response to a trigger for a new planning area/filter (e.g., in response to a trigger associated with the cell 924 of FIG. 9A), the system can automatically extend a current filter (e.g., the filter 915) to generate an adjusted filter 942, corresponding to the region US and years 2013 and 2014.

An updated data copy 944, which is an updated data copy of the data copy 916 of FIG. 9A, includes data for region US and year 2014. That is, the updated data copy 944 has been updated to include, along with data 944*a* for region US and year 2013, new data 944*b* (e.g., copied from the data source 902) for region US and year 2014. In response to the trigger to extend the planning area, only data for region US and year 2014 is added to the data copy 916 to generate the updated data copy 944. The data for region US and year 2013 is maintained in the updated data copy 944 (e.g., data for region US and year 2013 is not recopied from the data source 902).

The system can generate and display a view 946 that is an updated view updated from the view 918 of FIG. 9A. The view 946 has an editable cell 948 corresponding to sales for region of US and year 2014. The system can also determine that the user has attempted, is attempting, or desires to edit a value in a cell 950 for the region Italy and the year 2013. Accordingly, the system can automatically further extend the adjusted filter 915, as described below.

FIG. 9C is a diagram 970 that illustrates automatic extension of a partially-editable dataset copy. In response to a trigger for a new planning area/filter (e.g., in response to a trigger associated with the cell 950 of FIG. 9B), the system can automatically extend a current filter (e.g., the adjusted filter 942) to generate a further-adjusted filter 972, corresponding to the regions US and Italy and years 2013 and 2014.

An updated data copy 974, which is an updated data copy of the data copy 944 of FIG. 9B, includes data for regions US and Italy and years 2013 and 2014. That is, the updated data copy 974 has been updated to include, along with the data 944a and 944b, new data 974a for region Italy and year 2013 and new data 974b for region Italy and year 2014.

Although the trigger associated with the cell 950 was for region of Italy and year 2013, in some implementations, the further-adjusted filter 972 when used to generate the updated data copy 974 retrieves data for region of Italy and year 2014 (as well as year 2013), for filter efficiency reasons, for example. The filter generator 120 of FIG. 1 can determine that query performance may be improved by also including year 2014, for example.

The system can generate and display a view 976 that is an updated view updated from the view 946 of FIG. 9B. The view 976 has an editable cell 978 corresponding to sales for region of Italy and year 2013 and an editable cell 980 corresponding to sales for region of Italy and year 2014.

Figure 10A:
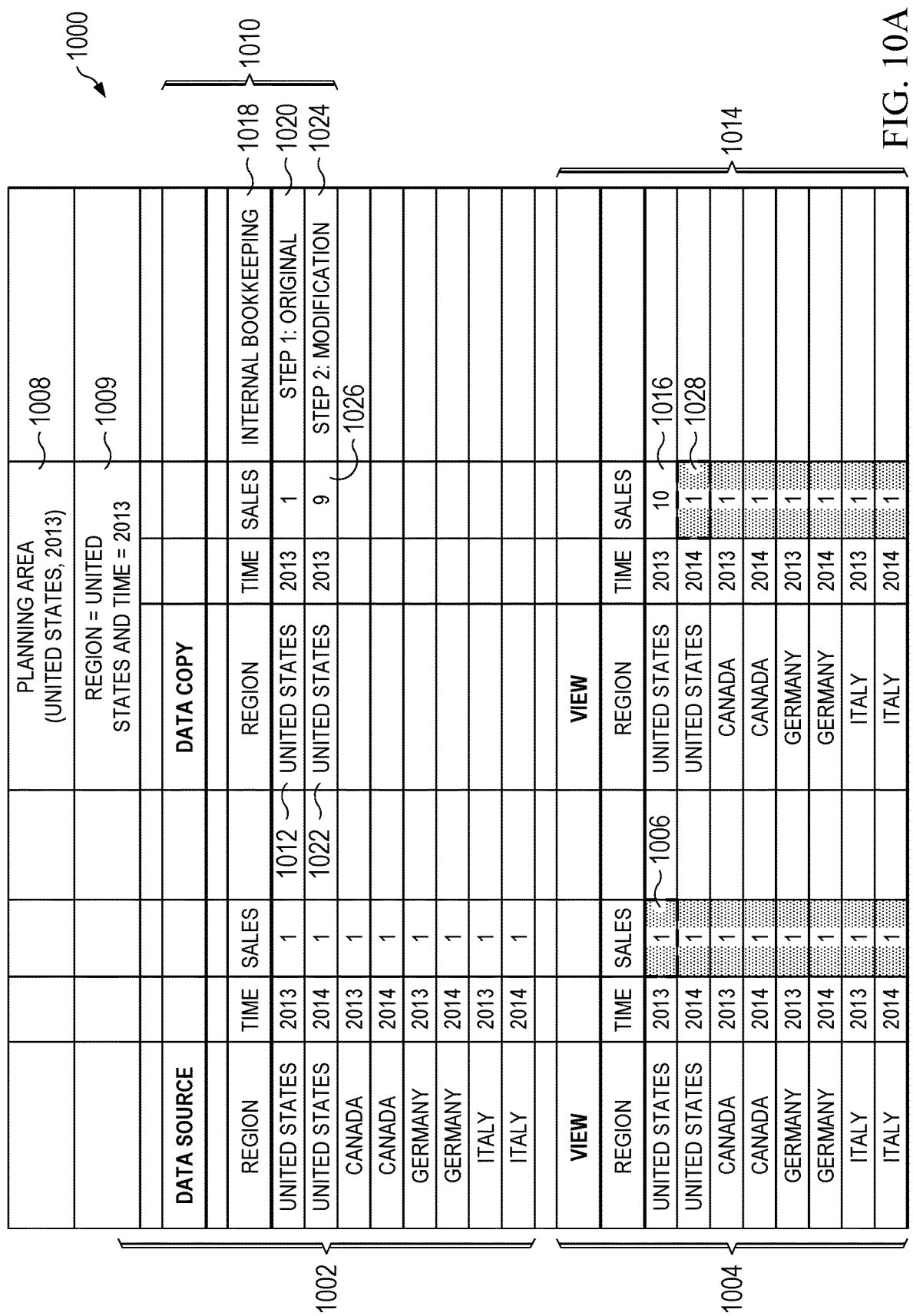

FIG. 10A is a diagram 1000 that illustrates automatic extension of a partially-editable dataset copy. Similar to the data source 902 of FIG. 9A, a data source 1002 includes region, time, and sales dimensions. An initial view 1004 can be displayed to a user, for example. Cells for sales values can be presented, but can be initially displayed as uneditable to the user. That is, no initial planning area/filter is applied for the view 1002. The system can determine that the user has either attempted to, or can predict that the user would like to or likely wants to edit a cell 1006 corresponding to sales for a US region and year 2013. Such a determination or prediction can be treated as a trigger to create an initial planning area/filter. Accordingly, the system can define a planning area 1008 for region US and year 2013 using a filter 1009.

The system can, in accordance with the filter 1009, generate a data copy 1010 that initially has data 1012 just for region of US and year 2013. The system can generate and display a view 1014 that is an updated view updated from the view 1004. The view 1014 has an editable cell 1016 corresponding to sales for region of US and year 2013. The view 1014 can accept any change of data for region of US and year 2013. For instance, the view 1014 is shown as displaying a value of 10 in the cell 1016 indicating that the user changed a value of one (e.g., as initially displayed in the cell 1006) to the value of 10 now shown in the cell 1016.

In some implementations, the system can maintain bookkeeping information to support undo, redo, and other activities or operations. For instance, bookkeeping data 1018 can include information 1020 that indicates that a value of one is an original value for the US region year 2013 dimension combination. In response to the user modifying the value of the cell 1016 to be a value of 10, the system can create a bookkeeping entry 1022 that includes an indicator 1024 indicating that a modification occurred to data for region US and year 2013 as indicated by a modification value 2026 of 9. In this example, the modification value 2026 represents a delta change from the original value of one. Delta values can be used to support a sum aggregation operation (e.g., using the original value of 1 and the modification value 2026 (e.g., delta value) of 9, to arrive at the current value of 10 for the dimension member combination for region US and year 2013. In other implementations, bookkeeping information can include modification of values in place (e.g., the modification value 1026 can be a current value of 10). The bookkeeping information 1018 can be stored in or in association with the data copy 1010.

A cell, such as the cell 1028 in the view 1014, can represent a cell for which a trigger (e.g., attempt or determined intent to edit) has occurred to extend the filter 1009. For example, the system can determine that the user has attempted, is attempting, or desires to edit a value in the cell 1028 for the region US and the year 2014. Accordingly, the system can automatically extend the filter 1009 and generate updated bookkeeping information, as described below.

FIG. 10B is a diagram 1040 that illustrates automatic extension of a partially-editable dataset copy. In response to a trigger for a new planning area/filter (e.g., in response to a trigger associated with the cell 1028 of FIG. 10A), the system can automatically extend a current filter (e.g., the filter 1009) to generate an adjusted filter 1042, corresponding to the region US and years 2013 and 2014.

An updated data copy 1044, which is an updated data copy of the data copy 1010 of FIG. 10A, includes data 1046 for region US and year 2014. The data 1046 can include or be associated with bookkeeping information 1048 that indicates that the data 1046 was added to the data copy 1044 as a result of an automatic filter extension.

The system can generate and display a view 1050 that is an updated view updated from the view 1014 of FIG. 10A. The view 1050 has an editable cell 1052 corresponding to sales for region of US and year 2014. The view 1014 is shown as displaying a value of 10 in the cell 1052 indicating that the user changed a value of one (e.g., as initially displayed in the cell 1028 in FIG. 10A) to the value of 10 now shown in the cell 1028. Accordingly, the system can add an entry 1054 to the data copy 1044 (or generally to the bookkeeping information 1018) with a modification indication 1056 and a modification (e.g., delta) value 1058 of 9.

The system can also determine that the user has attempted, is attempting, or desires to edit a value in a cell 1060 for the region Italy and the year 2013. Accordingly, the system can automatically further extend the adjusted filter 1042 and generate updated bookkeeping information, as described below.

FIG. 10C is a diagram 1070 that illustrates automatic extension of a partially-editable dataset copy. In response to a trigger for a new planning area/filter (e.g., in response to a trigger associated with the cell 1060 of FIG. 10B), the system can automatically extend a current filter (e.g., the adjusted filter 1042) to generate a further-adjusted filter 1072, corresponding to the regions US and Italy and years 2013 and 2014.

An updated data copy 1074, which is an updated data copy of the data copy 1044 of FIG. 10B, includes new data 1076 and 1078 for Italy 2013 and Italy 2014, respectively. The new data 1076 and 1078 can include or be associated with bookkeeping information 1080 or 1082, respectively, that indicates that respective data was added to the data copy 1074 as a result of an automatic filter extension.

The system can generate and display a view 1084 that is an updated view updated from the view 1046 of FIG. 10B. The view 1084 now has editable cells 1086 and 1088 corresponding to sales for Italy 2013 and Italy 2014, respectively. The view 1084 is shown as displaying a value of 10 in the cell 1086 indicating that the user changed a previous value of one (e.g., as initially displayed in the cell 1060 in FIG. 10B) to the value of 10 now shown in the cell 1086. Accordingly, the system can add an entry 1090 to the data copy 1074 (or generally to the bookkeeping information 1018) with a modification indication 1092 and a modification (e.g., delta) value 1094 of 9.

As mentioned, the bookkeeping information 1018 can be used to perform undo operations. As indicated by notes 1096a, 1096b, and 1096c, the bookkeeping information 1018 can represent a series of actions that can have interrelated functional dependencies. An undo engine (e.g., the undo engine 138 of FIG. 1) can iterate backwards chronologically through the bookkeeping information 1018 and use, for example, respective modification values and change indicators to undo previous operations.

Figure 11:
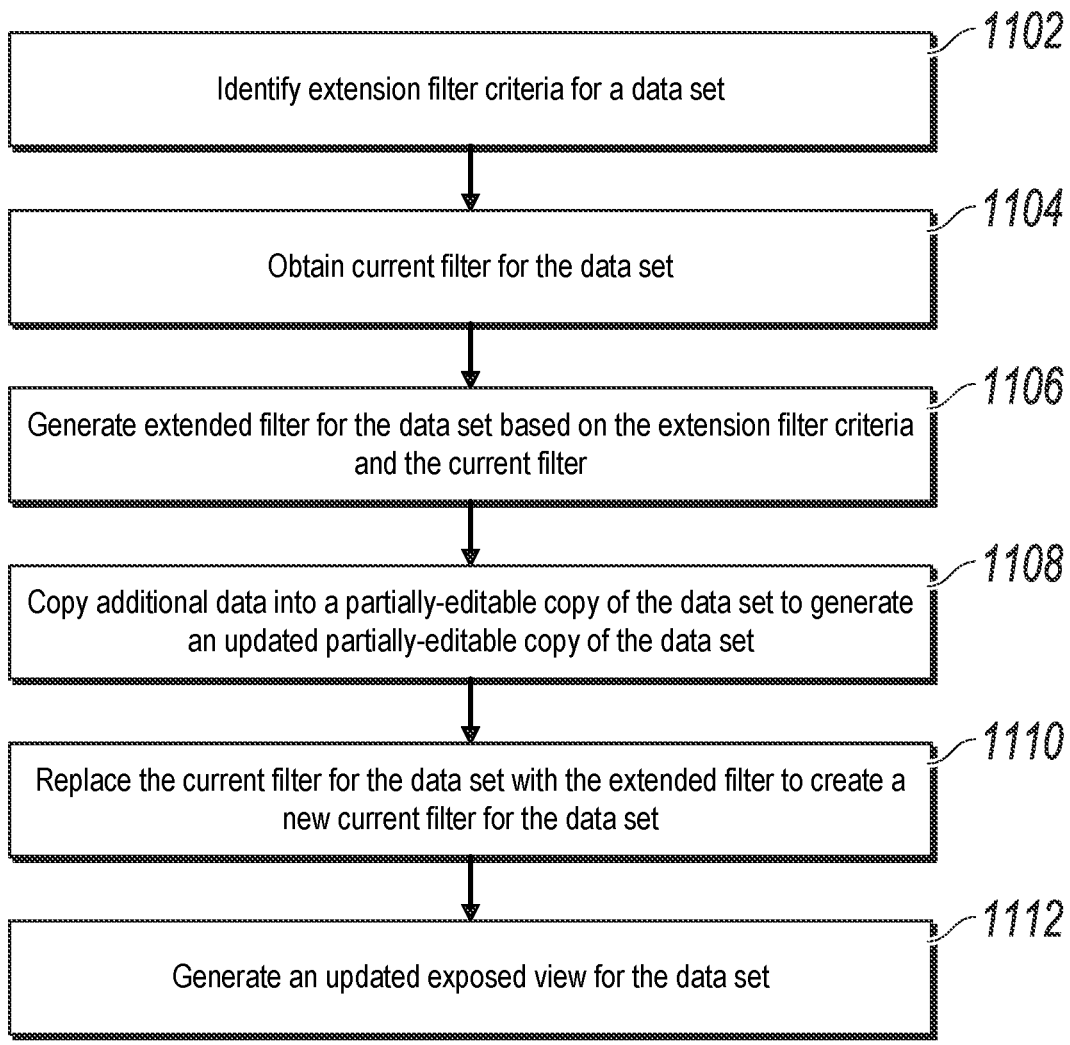
FIG. 11 is a flowchart of an example method for automatically extending a partially-editable dataset copy.

FIG. 11 is a flowchart of an example method 1100 for automatically extending a partially-editable dataset copy. It will be understood that method 1100 and related methods may be performed, for example, by any suitable system, environment, software, and hardware, or a combination of systems, environments, software, and hardware, as appropriate. For example, one or more of a client, a server, or other computing device can be used to execute method 1100 and related methods and obtain any data from the memory of a client, the server, or the other computing device. In some implementations, the method 1100 and related methods are executed by one or more components of the system 100 described above with respect to FIG. 1. For example, the method 1100 and related methods can be executed by the automatic extension engine 133 of FIG. 1.

At 1102, extension filter criteria is identified for a data set. The extension filter criteria extends a current filter that defines an editable portion of the data set. The editable portion of the data set corresponds to a partially-editable copy of the data set.

Identifying the extension filter criteria can include determining that a user intends to edit data that is outside of the partially-editable copy of the data set and that is included in a non-editable portion of the data set. Determining that the user intends to edit data that is outside of the partially-editable copy of the data set can include predicting that the user intends to edit the data outside of the partially-editable copy. As another example, determining that the user intends to edit data that is outside of the partially-editable copy of the data set can include receiving a user input in the exposed view in an area of the exposed view corresponding to the non-editable portion of the data set. In some cases, identifying the extension filter criteria can include determining that a user has edited data in a local cache of data that is outside of the partially-editable copy of the data set.

At 1104, the current filter for the data set is obtained.

At 1106, an extended filter for the data set is automatically generated based on the extension filter criteria and the current filter. Generating the extended filter for the data set based on the extension filter criteria and the current filter can include iterating over filter criteria in the current filter and extending each filter criterion in the current filter with filter criterion values from the extension filter that have a same dimension as the current filter.

At 1108, additional data is copied into the partially-editable copy of the data set based on the extended filter and the current filter to generate an updated partially-editable copy of the data set. For example, portions of the data set that match the extension filter criteria can be copied into the partially-editable copy of the data set.

At 1110, the current filter for the data set is replaced with the extended filter to create a new current filter. In some examples, one or more optimizations are performed on the extended filter before replacing the current filter with the extended filter. In some implementations, a bookkeeping entry is created to save the current filter before replacing the current filter with the extended filter. The bookkeeping entry can be used to restore the current filter, for example.

At 1112, an exposed view for the partially-editable copy of the data set is updated based on the new current filter to generate an updated exposed view that exposes the updated partially-editable copy of the data set and an updated non-editable portion of the data set. The updated non-editable portion of the data set exposed by the updated exposed view can be identified using a negation of the new current filter.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
identifying, for a data set, extension filter criteria that extends a current filter that defines an editable portion of the data set, wherein the editable portion of the data set corresponds to a partially-editable copy of the data set;
obtaining the current filter for the data set;
automatically generating an extended filter for the data set based on the extension filter criteria and the current filter;
copying additional data into the partially-editable copy of the data set based on the extended filter and the current filter to generate an updated partially-editable copy of the data set;
replacing the current filter for the data set with the extended filter to create a new current filter; and
updating an exposed view for the partially-editable copy of the data set based on the new current filter to generate an updated exposed view that exposes the updated partially-editable copy of the data set and an updated non-editable portion of the data set.

2. The computer-implemented method of claim 1, wherein copying the additional data into the partially-editable copy of the data set based on the extended filter and the current filter to generate the updated partially-editable copy of the data set comprises copying, into the partially-editable copy of the data set, portions of the data set that match the extension filter criteria.

3. The computer-implemented method of claim 1, wherein the updated non-editable portion of the data set exposed by the updated exposed view is identified using a negation of the new current filter.

4. The computer-implemented method of claim 1, wherein generating the extended filter for the data set based on the extension filter criteria and the current filter comprises iterating over filter criteria in the current filter and extending each filter criterion in the current filter with filter criterion values from the extension filter that have a same dimension as the current filter.

5. The computer-implemented method of claim 1, further comprising performing at least one optimization on the extended filter before replacing the current filter with the extended filter.

6. The computer-implemented method of claim 1, wherein identifying the extension filter criteria comprises determining that a user intends to edit data that is outside of the partially-editable copy of the data set and is included in a non-editable portion of the data set.

7. The computer-implemented method of claim 6, wherein determining that the user intends to edit data that is outside of the partially-editable copy of the data set comprises predicting that the user intends to edit the data outside of the partially-editable copy.

8. The computer-implemented method of claim 6, wherein determining that the user intends to edit data that is outside of the partially-editable copy of the data set comprises receiving a user input in the exposed view in an area of the exposed view corresponding to the non-editable portion of the data set.

9. The computer-implemented method of claim 1, wherein identifying the extension filter criteria comprises determining that a user has edited data in a local cache of data that is outside of the partially-editable copy of the data set.

10. The computer-implemented method of claim 1, further comprising creating a bookkeeping entry to save the current filter before replacing the current filter with the extended filter.

11. The computer-implemented method of claim 10, further comprising using the bookkeeping entry to restore the current filter.

12. A system comprising:
one or more computers; and
a computer-readable medium coupled to the one or more computers having instructions stored thereon which, when executed by the one or more computers, cause the one or more computers to perform operations comprising:
identifying, for a data set, extension filter criteria that extends a current filter that defines an editable portion of the data set, wherein the editable portion of the data set corresponds to a partially-editable copy of the data set;
obtaining the current filter for the data set;
automatically generating an extended filter for the data set based on the extension filter criteria and the current filter;
copying additional data into the partially-editable copy of the data set based on the extended filter and the current filter to generate an updated partially-editable copy of the data set;
replacing the current filter for the data set with the extended filter to create a new current filter; and
updating an exposed view for the partially-editable copy of the data set based on the new current filter to generate an updated exposed view that exposes the updated partially-editable copy of the data set and an updated non-editable portion of the data set.

13. The system of claim 12, wherein copying the additional data into the partially-editable copy of the data set based on the extended filter and the current filter to generate the updated partially-editable copy of the data set comprises copying, into the partially-editable copy of the data set, portions of the data set that match the extension filter criteria.

14. The system of claim 12, wherein the updated non-editable portion of the data set exposed by the updated exposed view is identified using a negation of the new current filter.

15. The system of claim 12, wherein generating the extended filter for the data set based on the extension filter criteria and the current filter comprises iterating over filter criteria in the current filter and extending each filter criterion in the current filter with filter criterion values from the extension filter that have a same dimension as the current filter.

16. The system of claim 12, wherein the operations further comprise performing at least one optimization on the extended filter before replacing the current filter with the extended filter.

17. A non-transitory, computer-readable medium coupled to one or more processors and having instructions stored thereon which, when executed by the one or more processors, cause the one or more processors to perform operations, the operations comprising:
identifying, for a data set, extension filter criteria that extends a current filter that defines an editable portion of the data set, wherein the editable portion of the data set corresponds to a partially-editable copy of the data set;
obtaining the current filter for the data set;
automatically generating an extended filter for the data set based on the extension filter criteria and the current filter;
copying additional data into the partially-editable copy of the data set based on the extended filter and the current filter to generate an updated partially-editable copy of the data set;
replacing the current filter for the data set with the extended filter to create a new current filter; and
updating an exposed view for the partially-editable copy of the data set based on the new current filter to generate an updated exposed view that exposes the updated partially-editable copy of the data set and an updated non-editable portion of the data set.

18. The computer-readable medium of claim 17, wherein copying the additional data into the partially-editable copy of the data set based on the extended filter and the current filter to generate the updated partially-editable copy of the data set comprises copying, into the partially-editable copy of the data set, portions of the data set that match the extension filter criteria.

19. The computer-readable medium of claim 17, wherein the updated non-editable portion of the data set exposed by the updated exposed view is identified using a negation of the new current filter.

20. The computer-readable medium of claim 17, wherein generating the extended filter for the data set based on the extension filter criteria and the current filter comprises iterating over filter criteria in the current filter and extending each filter criterion in the current filter with filter criterion values from the extension filter that have a same dimension as the current filter.

* * * * *